(12) United States Patent
Pronovost et al.

(10) Patent No.: US 9,259,709 B2
(45) Date of Patent: Feb. 16, 2016

(54) COMPOSITES FOR WATER REMEDIATION

(71) Applicant: Red Lion Chem Tech, LLC

(72) Inventors: Allan D. Pronovost, San Diego, CA (US); Michael E. Hickey, Escondido, CA (US)

(73) Assignee: RED LION CHEM TECH, LLC, San Diego, CA (US)

( * ) Notice: Subject to any disclaimer, the term of this patent is extended or adjusted under 35 U.S.C. 154(b) by 422 days.

(21) Appl. No.: 13/777,957

(22) Filed: Feb. 26, 2013

(65) Prior Publication Data

US 2014/0157620 A1 Jun. 12, 2014

Related U.S. Application Data

(60) Provisional application No. 61/734,826, filed on Dec. 7, 2012.

(51) Int. Cl.

| | | |
|---|---|---|
| *B01J 20/26* | (2006.01) | |
| *B01J 20/12* | (2006.01) | |
| *B01J 20/18* | (2006.01) | |
| *B01J 20/28* | (2006.01) | |
| *B01J 20/16* | (2006.01) | |
| *B01J 20/10* | (2006.01) | |

(52) U.S. Cl.
CPC .............. *B01J 20/262* (2013.01); *B01J 20/103* (2013.01); *B01J 20/12* (2013.01); *B01J 20/165* (2013.01); *B01J 20/18* (2013.01); *B01J 20/261* (2013.01); *B01J 20/267* (2013.01); *B01J 20/2805* (2013.01); *B01J 20/28023* (2013.01); *B01J 20/28061* (2013.01); *B01J 2220/46* (2013.01); *B01J 2220/68* (2013.01)

(58) Field of Classification Search
CPC ............ B01J 20/26; B01J 20/20; B01D 27/02
USPC ......................................... 502/402, 407, 526
See application file for complete search history.

(56) References Cited

U.S. PATENT DOCUMENTS

| | | |
|---|---|---|
| 5,599,335 A | 2/1997 | Goldman et al. |
| 5,669,894 A | 9/1997 | Goldman et al. |
| 6,524,670 B1 | 2/2003 | Kataoka |
| 2003/0170406 A1 | 9/2003 | Watanabe et al. |
| 2005/0277548 A1 | 12/2005 | Watanabe et al. |
| 2008/0250916 A1 | 10/2008 | Bailey |
| 2009/0163365 A1 | 6/2009 | Bentlage et al. |
| 2009/0274519 A1 | 11/2009 | Shaw |
| 2011/0297575 A1 | 12/2011 | Bouchard et al. |

FOREIGN PATENT DOCUMENTS

GB 2438613 A 12/2007

*Primary Examiner* — Edward Johnson
(74) *Attorney, Agent, or Firm* — Morrison & Foerster LLP

(57) ABSTRACT

An effective composite for absorbing both standing and flowing water which comprises a fumed silica component, a water-absorbent acrylic polymer a fibrous component, and three types of scoriaceous components is described. Bags containing the composite may also be used.

16 Claims, 1 Drawing Sheet

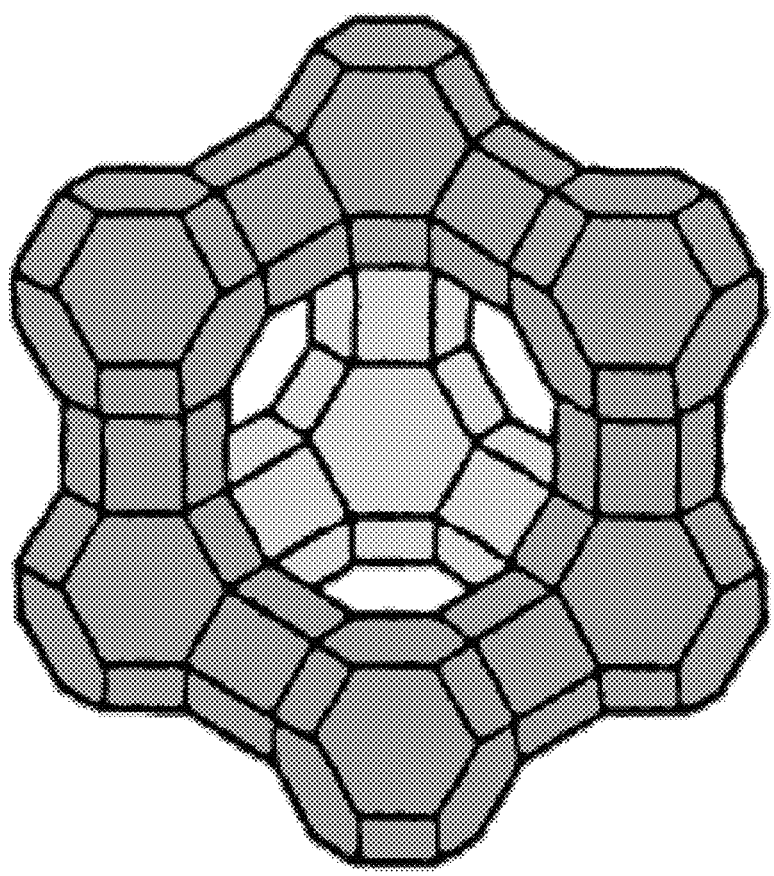

COMPOSITES FOR WATER REMEDIATION

CROSS-REFERENCE TO RELATED APPLICATIONS

This application claims priority from U.S. Ser. No. 61/734,826 filed 7 Dec. 2012. The contents of these documents are incorporated by reference herein in their entirety.

TECHNICAL FIELD

The invention relates to a high efficiency water-absorbing composite comprising an admixture of organic and inorganic components. Water uptake of at least 600 times the weight of the absorbing material is achieved.

BACKGROUND ART

Water-absorbing resins are widely used in water-retaining agents, dehydrating agents, sludge coagulants and other consumer products. Water-absorbing resins are available in a variety of forms, including substituted and unsubstituted natural and synthetic polymers, such as starch/acrylonitrile graft polymers, carboxymethylcellulose, crosslinked polyacrylates, sulfonated polystyrenes, hydrolyzed polyacrylamides, polyvinyl alcohols, polyethylene oxides, polyvinylpyrrolidones, and polyacrylonitriles.

The most commonly used polymer for absorbing electrolyte containing aqueous fluids is partially neutralized polyacrylic acid (PAA), i.e., containing about 50% to 100%, neutralized carboxyl groups. An exemplary commercially available material is poly(acrylic acid) partial sodium salt from Sigma Aldrich Corporation, St. Louis, Mo.

In addition commercially available polymer fibrous materials are: REON™ 200 from Absorbent Technologies, Beaverton, Oreg.; and Water-Lock® 400 from Grain Processing Corporation, Muscatine, Iowa.

Such water-absorbing resins are termed "superabsorbent polymers," or SAPs, and typically are lightly cross-linked hydrophilic linear or hydrophilic polymers. SAPs are disclosed in Goldman, et al., U.S. Pat. Nos. 5,669,894 and 5,599,335. US2008/250916 describes barge units with bags containing absorbent fibrous material. US2009/163365 describes a water-swellable material comprising a crosslinked polymer matrix containing inorganic particles. US2009/274519 describes a water-fillable flood control device. US2011/297575 describes a bag containing water-absorbent for retaining soil on slopes. U.S. Pat. No. 6,524,670 describes a double layered bag containing an absorbent. US2003/170406 describes a specialized device containing a water absorbent. US2005/277548 describes a water absorbent containing grafted acrylonitrile and styrene. GB 2438613A describes a specially designed bag for water absorbents.

SAPs can differ in their chemical identity, but all SAPs are capable of absorbing and retaining various amounts of aqueous fluids equivalent to multiple times their own weight but not beyond. Presently available SAPs can absorb distilled water up to one hundred times their own weight.

Conventional SAPs undergo surface swelling when wetted with a fluid such that continued transport of the fluid into the cross-linked particle interior or linear polymer interior is substantially compromised or prevented completely such that the optimal maximum swell ratios of up to 100× are seldom achieved. To counteract this restriction of surface swelling, substantial amounts of cellulose fibers have been included in many products so as quickly to absorb and distribute the fluid for eventual supply to the SAP particles. Commonly used are absorbent cotton fibers and compositions thereof.

In addition, inert inorganic substances having large surface areas are known to have slight absorbent properties. These secondary components are hydrophilic, inorganic minerals, such as microporous alumino silicate minerals or other volcanic scoriaceous materials. Particular examples include: molecular sieves; bentonite clays, such as aluminum phyllosilicates; and montmorillonite clay, or sodium bentonite; or zeolites such as analcime, chabazite, clinoptilolite, heulandite, natrolite, phillipsite, or stilbite. Exemplary commercially available materials are the bentonite Texas Sodium Bentonite, available from Texas Sodium Bentonite, Inc., of Comanche, Tex., and the St. Cloud Natural Zeolite, which is a natural clinoptilolite form of potassium aluminosilicate, available as powders and granules from a number of sources including GSA Resources, a subsidiary of St. Cloud Mining Company of Winston, N. Mex. These solid alternate phase carriers are commercially available in various particle sizes.

Additionally, materials showing slight absorbent properties are available from Cabot Corporation which supplies a number of different fumed silica products suitable for use in the invention compositions. These include various products with a large hydrophilic surface area: Cab-O-Sil™ EH-5 (380 $m^2/g$ of surface area), Cab-O-Sil™ HS-5 (325 $m^2/g$ of surface area), Cab-O-Sil™ M-5P (200 $m^2/g$ of surface area), Cab-O-Sil™ M-5 (200 $m^2/g$ of surface area), Cab-O-Sil™ PTG (200 $m^2/g$ of surface area), Cab-O-Sil™ MS-55 (255 $m^2/g$ of surface area), Cab-O-Sil™ LM-150 (160 $m^2/g$ of surface area).

Fibrous materials such as cloth have been employed to remove undesirable water remaining due to leakage or flooding. Again, absorption is minimal at best, generally <2×. Alternatively, excess water can be vacuumed. However, when the amount of water is large, these methods are inefficient and time consuming.

Traditionally, sandbags, filled with sand, have been used to prevent water from egressing into occupied areas of homes and businesses. They have also been used to prevent the overflow of rivers, lakes, marshes, etc. The weight and volume of conventional sandbags makes them difficult to transport. Water absorption by sandbags is minimal. Thus, "sandless sandbags" using the above mentioned SAP components (without however added inert inorganic substances such as bentonite or zeolites, or fumed silica or other fibrous polymers like starch) have been developed to circumvent some of these problems. These are typically comprised of a polyacrylic acid powder without filler to aid in absorbing of water and may include the same fabric material used in baby diapers or tampons. The outer bags, exposed to the environment, themselves are made of traditional materials, including burlap, polyester, polypropylene, or nonwoven polymers.

DISCLOSURE OF THE INVENTION

The invention provides an improved composite for rapid unimpeded absorption of large amounts of water. The composites of the invention can typically absorb 600 times or more aqueous material compared to their weight. The composites contain six essential components: three volcanic scoriaceous materials at least one of which must be a zeolite, preferably CBV300 and/or CBV712, at least one absorbent acrylic polymer, at least one fumed silica, and at least one fibrous material typically a starch polymer. The scoriaceous materials may be natural or synthetic; the acrylic polymer may be a polyacrylic acid, polyacrylamide, and the like; and the fumed silica has a high hydrophilic surface area. The fibrous material typically contains non-biodegradable starch polymer and provides support for the remaining components. The amount of water absorbed by the composite is greater than any component individually, or the sum of absorptions for all the individual components.

The invention is also directed to water-permeable packaged forms of the composite and to a method for removing standing water or stopping the flow of standing water using the absorbent materials of the invention and packaged forms of these composites.

BRIEF DESCRIPTION OF THE DRAWING

The FIGURE shows a typical single nanocage faujasite structure.

MODES OF CARRYING OUT THE INVENTION

The composites of the invention have enhanced ability to rapidly absorb large amounts of water in relatively short periods of time without impedance with composite absorption greater than the absorption of any component alone, or the sum of absorption for all composite components individually. A six component composite has been found to be optimal. These six components are as follows:

a first component which is a hydrophilic fumed silica of high hydrophilic surface area of appropriate chemical functionality;

a second component which is a superabsorbing polymer (SAP), typically a polyacrylate;

a third component which is also a SAP, typically a starch in non-crosslinked form;

a fourth component that is a first type of scoriaceous material, typically a pre-formed zeolite;

a fifth component which is specifically a zeolite with desirable properties typified by CBV300 and zeolite CBV712; and a sixth component, also a scoriaceous material from the clay family.

Without intending to be bound by any theory, it is believed that the presence of fumed silica of high surface area (first component) provides mixed clathrates in combination with other materials through hydrogen bonding of water molecules in addition to affording nanocages for further entrapment of water as guest molecules. A tri-clathrate is one envisioned end product. The absorbing capacity of the composite is enhanced by the inclusion of two polymers. The first polymer (second component) is formed from acrylic acid, acrylamide, or acrylonitrile or mixtures or copolymers thereof which themselves are SAPs. These SAP polymers are typically used in a crosslinked beaded form and serve to both rapidly establish an osmotic gradient and to prevent clumping of the second polymer.

The second polymer (third component) is also a SAP but differs from the first SAP in that it is used in an un-crosslinked linear polymeric form. It functions to provide a water absorbency bulk non-crosslinked linear polymer fibrous component. Suitable second polymers include a non-biodegradable starch graft such as REON™ (Absorbent Technologies, Beaverton, Oreg.). The second SAP, in addition to providing high water adsorption also affords composite component random cross-meshing and subsequent gelatinization at room temperature.

The fourth and fifth major components used in conjunction with the water absorbing main enclathration agent and the beaded and linear SAPs noted above are scoriaceous volcanic components specifically selected to have surface adhesion capabilities independent of the surface or molecules they come into contact with.

The fourth component, or first scoriaceous material, is a mined, preformed zeolite which is a potassium aluminum silicate of a clinoptilolite such as ZK406H. This component has been found to aid in subparticulate adhesion of REON™ polymers and aids in cross-linking and cohesion. Used in a high mesh, aqueous small particulate form the zeolite ZK 406H, or equivalent, has a net zeta potential found to be electronegative relative to the first polymer (second component of the invention compositions; SAP in beaded form) and the second polymer (third component; uncrosslinked linear polymeric starch SAP) such that electrostatic attraction allows the beaded second component and linear polymeric third component to electrostatically adhere to each other via bridging by the zeolite so as to result in an adherent mass. Through such aqueous electrostatic adherence the zeolite also affords the necessary interpolymer and interbead space to minimize surface swelling of the second and third component, hence, resulting in reduced impedance of water absorption. Without ZK 406H or its equivalent as additive the second and third components would not amass to each other and would exhibit surface swelling and occlusion of pores resulting in reduced absorption.

The fifth component, or second scoriaceous mordant, is a mined, non-pre-formed zeolite that exhibits properties different form the fourth component ZK406H or its equivalent. This is non-preformed zeolite that is capable of three unique functional properties:
1) spontaneous self-assembly upon contact with water wherein said materials are utilized before hydration in an unassembled nanoparticulate subassembly form; 2) adhesion to all molecular species and surfaces without discrimination (occurs upon primary re-assembly upon initial hydration); and 3) forced contraction of surfaces adhered to, namely to densify harden, envelop, and engirdle the mass. Of all known zeolites, only two have been found empirically to afford these autopoietic spontaneous self re-assembling polymorphous adhesion properties, namely zeolite CBV300 and zeolite CBV712. All other tested variants, even in the CBV series, do not self-assemble, adhere, harden, envelop, engirdle or compact. The adhesion and compaction properties of this component serve specifically to stabilize fumed silica based co-clathrates hence, resulting, in mixed clathrates of both reactive host molecules and spontaneous assembled host molecules. This fifth component zeolite such as CBV300 or CBV712 adheres to the other surfaces upon self-assembly followed by forced contraction and compaction mass comprised of linear and beaded forms of SAP's. Amassing by this zeolite host molecule upon co-clathration results in a full swollen solid mass of high absorption capacity that can be physically handled for standing water removal.

Zeolites CBV300 and CBV712 available in natural or synthetic unassembled micro- and nanostructure form are characterized by an $S_{iO2}/Al_2O_3$ mole ratio of 5.1 and 12 respectively. Both are utilized in the nominal cation form (for ammonium) and have unit pore sizes of 24.68 and 24.35 Å respectively; with an $Na_2O$ % weight of 2.8 and 0.05 respectively; and surface areas of 925 and 730 $m^2/g$. Both are classified as a faujasite, and are two of many variants of synthetic Zeolite Y forms. They exhibit autopoietic properties upon primary hydration coupled with adhesive and compactive properties and hence are unique for the invention.

The sixth component is also a scoriaceous material drawn from the clay family. Although clays exhibit water absorption up to 40×, their main function in the invention compositions is to afford mass (weight) to the composite to facilitate settling in standing water. Without added swellable mass, composites float. Settling in standing water is necessary for substrata contact for H₂O remediation. A typical material is non-clumping, granular bentonite clay. Other clays can be used such as VolClay®, or Panther Creek® which can have absorption ratios for water of up to 16:1. These materials, providing mass, are entrapped in the co-clathrates upon spontaneous assembly of the multiple host molecules, hence allowing and maintain settling in water versus the normal flotation exhibited by inorganic SAP's and fibrous polymeric SAP's on their own or in combination.

The various components are described in more detail below:

1. First Component: Fumed Silica:

An essential component of the water-absorbent composite of the invention is comprised of functionally reactive amorphous hydroxyl-derivatized silica subparticulate nanostructure subassemblies, synthesized by vapor phase hydrolysis of silicon tetrachloride in a hydrogen oxygen flame at temperatures above 1800° C. Upon cooling silicon dioxide molecules condense to form functionally reactive nanoparticles with diameters less than 30 nm (range 7-30 nm). Upon further condensation sub-particulate nanostructures attach and sinter together to produce small short chained functionally derivatized nanoparticulate subassemblies of branched chains, designated herein "reactive fumed silica." Preferably, branch chain subassemblies have a length of less than 0.5 microns. Functionally reactive amorphous silica nanostructure subassemblies produced by this method are of the general formula $[SiO_x(OH)_{4-2x}]$. (This is not to be confused with non-reactive silica-based macrocomposites such as silica gel or sized silica that have no functionality.)

These functionally reactive fumed silica subassemblies are extremely light, non-dense, amorphous, hydrophilic, hygroscopic, carry a net negative electrical charge and are difficult to handle. They contain a high saturation of surface siloxane groups and silanol (hydroxyl) groups. Silanol groups occur as four populations depending upon moisture content and degree of substitution: isolated hydroxyl groups, hydrogen-bonded hydroxyl groups, vicinal hydroxyl groups (the vicinal pair), and the geminal variant containing two hydroxyls. Functionally reactive amorphous nanoparticulate silica subassembly powders most suitable for use in the composites of the invention are carefully equilibrated for normal surface moisture. The subassembly aggregation behavior of functionally reactive amorphous hydroxyl-derived silica powders is dependent on the hydration force, which is modifiable by the surface silanol structure. In addition, the subassembly aggregation behavior is modifiable by the surface silanol structure. Subparticulate spheres <30 nm in diameter are preferred, wherein the functionally reactive surface silanols are primarily isolated hydroxyl groups. Functionally reactive amorphous silica powders suitable for the present invention have a moisture content of <1.5% and preferably <0.1% to reduce the number of hydrogen-bonded hydroxyl groups present. Functionally reactive silanols, thus formed and surface distributed produce a wide range of hydrogen bonded structures ranging from simple dimers, through various types of chain and sheets, to extended three-dimensional lattice networks in conjunction with other spontaneous self-assembly sub-assemblies when used for guest moieties sequestration, bonding, and enclathration in the presence of water. The results are nanocages which further entrap water as guest molecules.

The overall electronegative charge, light nature and low density of functionally reactive fumed silica subassemblies make it difficult to handle alone as a dry powder without other components, however the handling qualities of the invention composites are acceptable.

A characteristic of the functionally reactive fumed silica sub-assemblies for use in the invention compositions is a silanol-enriched "reactive state" for surface hydroxyls so as to assure maximal reactivity. The saturation density (>8 functional reactive sites/$nm^2$), coupled with a small unassembled particulate nanostructure size (<30 nm) with high surface area (>380 $m^2/g$), a short branched chain subassembly length (<0.5 microns), and an overall net negative charge are helpful for spontaneous co-clathratization in the presence of water. Clathrates produced in aqueous media are hydrogen bonded cross-linked 3-D labyrinths.

In preferred embodiments, the nanoparticulate reactive fumed silica sub-assemblies comprise at least eight hydroxyl groups per square nanometer. Various levels of hydroxylated nanoparticulate fumed silica are available commercially in grades of 150-400 with increasing levels of hydroxylation, varying upon moisture levels and extent of derivitization, varying in terms of reactive hydroxyls and/or silanols available per square nanometer.

As noted, the reactive nanoparticulate fumed silica subassemblies have a high surface area. In some embodiments, the unassembled reactive nanoparticulate fumed silica subassemblies have a surface area of at least 100, 150, 200, 250, 300, 350 $m^2/g$ or more. In other embodiments, the surface area is at least 350 $m^2/g$. In still other embodiments, the surface area is about 380 $m^2/g$.

In some embodiments, the reactive fumed silica nanoparticulates in the subassembly branched chains are less than 10, 20, 30, 50, or 80 nm in diameter at 0.1% moisture. Size may be tested by a particle counter or SEM and moisture may be determined by weight before and after drying at 60° C. or higher. In other embodiments, the reactive fumed silica nanoparticulate sub-assemblies contain nanoparticles less than 20 nm or even 10 nm in diameter at 0.1% moisture. In other embodiments, the reactive fumed silica nanoparticulate subassemblies are less than 30 nm in diameter at 0.1% moisture. In some embodiments, the reactive fumed silica nanoparticulate subassembly has a moisture content of <1.5%. In other embodiments, the reactive fumed silica nanoparticles have a moisture content of <0.1%. In some embodiments, the reactive fumed silica nanoparticles have a branched chain subassembly length of 1.0 micron or less, 0.75 microns or less, or 0.5 microns or less. In other embodiments, the unassembled reactive fumed silica nanoparticles have a branched chain subassembly length of 0.5 microns or less.

Commercially available examples of reactive nanoparticulate fumed silica is available from Cabot of Boston, Mass., as Cab-O-Sil™ EH5 (380 $m^2/g$ surface area), Cab-O-Sil™ HS-5 (325 $m^2/g$ of surface area), Cab-O-Sil™ M-5P (200 $m^2/g$ of surface area), Cab-O-Sil™ M-5 (200 $m^2/g$ of surface area), Cab-O-Sil™ PTG (200 $m^2/g$ of surface area), Cab-O-Sil™ MS-55 (255 $m^2/g$ of surface area), Cab-O-Sil™ LM-150 (160 $m^2/g$ of surface area), or Elkem Materials EMS-211, Norway; or fumed silica from Degussa.

The availability of reactive hydroxyl groups at the surface and of oxygen associated with the silane portions of the silica provide opportunities for direct hydrogen bonding. As is understood, hydrogen bonding occurs by virtue of a hydrogen donor atom (which would be a hydrogen associated with a polar group such as N, O, or to a lesser extent S), with a hydrogen bond acceptor which is also a polar group, such as O, N, or to a lesser extent S. Thus, the oxygen groups of the siloxane can behave as hydrogen bond acceptors to hydrogens in guest moieties such as water that are bound to electronegative atoms and the hydroxyl groups provide hydrogen donors to electronegative atoms in the guest moieties such as in this case, water.

2. Second Component: Polyacrylic Acid SAP:

Polyacrylic acid (PAA) is a well-known superabsorbent polymer that has been used for this purpose since the mid-1960's when it was originally patented. It is a polymer of the formula

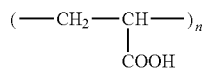

where n is approximately 100-2,000 or any intermediate specific number of units. For use in the composites of the invention typically the PAA is partially neutralized with sodium and/or potassium ions to varying degrees ranging from 30%-100% and all intermediate percentages. Although PAA is exemplified, minor sidechain modifications such as the addition of methyl groups, substitution of some of the carboxyl groups by carboxamides, or other substitutions that do not drastically reduce the absorbent properties are included in the composites of the invention. PAA is commercially available from many sources and is commonly used as a beaded absorbent in diapers. It is also used in various hair-styling products, toothpaste and a number of other household products. It serves as an additional absorbent in cooperation with the clathrate structure putatively associated with the composite.

3. Third Component: Fibrous Component:

Water absorbing, non-biodegradable, linear starch-based fibrous materials are also included to provide high moisture absorbency, crosslinking and subsequent gelatinization. A particularly preferred starch graft is a graft of starch with polyacrylonitrile copolymer, i.e., a starch-g-poly(2-propanamide-co-2-propenoic acid)K salt. It is marketed as REON™ by Absorbent Technologies, Inc., Beaverton, Oreg. Other fibrous materials could also be used, but this type of fiber is particularly advantageous because it is absorbent as well as serving to support the three-dimensional clathrate assemblies of the composite through random cross-meshing. The result is a three component, intercalated mixed clathrate; with water as both the swelling agent and the cross-linking agent in addition to the guest molecule present in the resultant nano cages as well. This constitutes the first report of a stabilized tri-clathrate 3-D structure.

4. Fourth, Fifth and Sixth Components: Scoriaceous Materials:

Three different categories of scoriaceous material are used, grouped by functionality. These include:

1) water absorbing mined scoriaceous material; i.e., specific zeolites such as ZK406H, that facilitate subparticulate adhesion (as in adhesion of nanoparticulate fumed silica subassemblies) to beaded polyacrylic acid (PAA), and to linear SAP's such as the REON™ starch polymers used in the illustrated composite; adhesion is facilitated through electrostatic attraction. In addition to adhesion, their presence facilitates necessary spacing between linear polymers and beaded structures to minimize surface swelling;

2) water absorbing unassembled synthetic minerals, specifically unassembled synthetic zeolites such as CBV300 or CBV712, which functionally exhibit the ability to self-assemble (upon primary hydration), adhere to any materials pressed in the composite or any surface, and to contract, harden, envelop, and engirdle composite components so as to stabilize clathrate formation and aid in composite component complexation and amassing; and 3) naturally occurring, clay type water absorbing volcanic scoriaceous materials such as non-clumping bentonite clay, which functionally serves to add mass (weight) to composites to or contain and sink them in standing water upon application. Amassed structures hence sink versus floating in standing water, a requirement for water remediation with standing water.

The synthetic materials capable of self-assembly, adhesion and compaction, for example, include: non-crystalline amorphous synthetic or natural faujasite; or alternatively mordenite nanostructure subassemblies which also exhibit spontaneous polymorphous crystallization properties and appropriate adherence to substrata in an aqueous environment that are compatible when used as part of the invention composites. Synthetic zeolite Y is one example of a self-assembly structure. Alternatively non-reactive amorphous faujasite and mordenite nanostructure subassemblies are also custom synthesizable. These latter natural crystalline aluminosilicates can be readily produced in dry powdered form high mesh form. The presence of alumina in the framework of the composite results in a net negative framework charge which is ideal. Other crystalline silicates such as zirconium silicate and the like may be used.

A dry-gel hydrothermal process used for synthesis of amorphous faujasite is described in U.S. Pat. No. 3,130,007 and U.S. Pat. No. 3,594,121 and with modifications can be used to produce custom host subassemblies. For example, non-reactive colloidal silica is mixed with a solution of sodium hydroxide and sodium aluminate at ambient temperature, followed by digestion for twenty-four hours. The reaction mixture is heated to 200° F. for an additional forty-eight hours to effect initial nanostructure subassembly formation. This results in unassembled clathrate host molecules. Metallic aluminosilicate sub-particulate nanostructure subassemblies with a $SiO_2/AlO_3$ ratio of 3-6 are obtained with a size of <600 nm, with unit pore sizes <25 Angstroms, and surface areas >700 $m^2/g$. The ammonium or sodium cationic form is utilized to afford highest attraction for hydration water for spontaneous assembly.

Natural faujasite, a rare zeolite, has the same framework topology as synthetic Linde X and Linde Y asymmetric, synthetic forms used as sorbents and catalysts in the petroleum industry. Roughly half of the framework unit-cell space is open in the dehydrated form (when assembled) and structurally it consists of sodalite cages connected cubically over six-membered double rings, resulting in wide open connecting channels, aperture size typically 7.4 Å. Upon hydration of faujasite structural subassemblies, reassembly occurs wherein approximately 50% of the cations reside in the sodalite cages, fully bonded to three framework oxygens of the six membered rings and to additional $H_2O$ molecules. Remaining cations and $H_2O$ molecules remain disordered in the large cavities. The cavities of faujasite (natural or synthetic) are the largest found in all zeolites hence allowing them to serve as host molecules capable of co-clathration with other host molecules such as synthetic amorphous silica subassemblies and/or organic linear fibrous polymers.

The synthetic versions are preferred as nanoparticulate unassembled ring structures lend themselves readily to autopoiesis upon hydration. Since sodalite consists of a body centered arrangement of B-cages, intercalation takes place through the 6-ring windows between any particular B-cage (nanocage) and one of its eight nearest neighbor cages. Synthetic faujasites in particular, upon assembly, have the general structure of a diamond-like lattice of B-cages which connect by 6-6 structured units in the presence of water. Assembled, they are represented by the general formula: $A_n(Al_nSi_{m-n}O_{2m})xH_2O$;

where A is the framework cation which serves as the template for spontaneous assembly upon hydration.

Sodalite cages are cross-linked to each other in array, either with partial or full random crystalline structure upon hydration.

The synthesized non-reactive amorphous faujasite nanocomposites produced under the above conditions yields nanostructure subassemblies <600 nm in size. Nanostructure subassemblies are polymorphous and asymmetric in shape and consist of truncated octahedral (beta cages or sodalite cages) connected through six member rings (6R), which upon crystallization form double-six rings (D6R, or hexagonal prisms) in a tetrahedral arrangement in stable crystalline form.

Synthesis of non-reactive amorphous mordenite nanostructures is described in U.S. Pat. No. 3,531,243. In one modification to this procedure, metallic aluminosilicate subparticulate nanostructure subassemblies with a $SiO_2/AlO_3$ ratio of 45-55 are obtained with an unassembled size of <600 nm with surface areas of >425 $m^2/g$. The framework of mordenite also contains a net negative charge and exhibits spontaneous self-assembly and amorphous crystallization upon primary hydration in combination with other composite components. Synthetic mordenite, also of the Linde Y family, has a relatively large pore structure containing two types of pores, one straight, and one elliptical. Synthetic mordenite exhibits excellent substrata adhesion properties to organic matter or other structures upon primary hydration, which is advantageous.

The water absorbing volcanic scoriaceous materials for the composites of the invention generally are hydrophilic, inorganic minerals, such as microporous aluminum silicate minerals or zirconium silicate. Additional examples include molecular sieves, bentonites, such as aluminum phyllosilicate; montmorillonite clay, as well as zeolites such as analcime, chabazite, clinoptilolite, heulandite, natrolite, phillipsite, or stilbite. Exemplary commercially available materials are the bentonite Texas Sodium Bentonite, available from Texas Sodium Bentonite, Inc., of Comanche, Tex., and St. Cloud Natural Zeolite, which is a natural clinoptilolite form of potassium aluminosilicate, available as powders and granules from a number of sources including GSA Resources, a subsidiary of St. Cloud Mining Company of Winston, N. Mex. Zeolite Y is a faujasite that occurs naturally. Zeolite Y can be obtained from Zeolyst International, Valley Forge, Pa., and is also useful. A synthetic form of Zeolite Y is also available. Zeolite Y has a three-dimensional pore structure with perpendicular pores of ≈7.4 Å in the x, y and z axes. These solid phase scoriaceous materials are commercially available in various nanoparticulate unassembled sizes.

One set of composites of the invention is shown in the table below, which further indicates the posited function of each component.

| Component | % by weight range | Preferred Weight (%) | Swell Ratio | Purpose For Use/MOA |
|---|---|---|---|---|
| EH5 (silica) | 10-30% | 22 | 26:1 | Enclathration, thixotropic effect |
| PAA Granules (SAP) | 1-15% | 10 | 300:1 | Establishes osmotic gradient rapidly; prevents clumping/and stickiness of REON ™ |
| REON ™ (starch/acrylic polymer graft) | 30-40% | 37 | 200:1 | High moisture absorption; cross-meshing and gelatinization |
| ZK406H ® (clinoptilolite zeolite) | 1-15% | 1 | 1:1 | Aids in electrostatic nanoparticulate adhesion in presence of moisture gel (REON ™) and PAA granules; and reduces surface swelling of both compounds |
| CBV300 (zeolite Y) | 1-5% | 1 | | Stabilizes 3-D clathrate, self-assembles and co-clathrates, aids in subparticulate 3-D complexation; and engirdling |
| Texas sodium Bentonite (clay) | 25-35% | 29 | 8:1 | Mass (weight) allows composite settling and holding container settling in standing water |
| All Combined | 100% | 100% | 570:1 | Maximal effect: rapid absorption, highest absorption ratio; tightest enclathration with stabilization and no impedance; non-floating. |

As noted above, the composites of the invention can be used as such without containment or can be packaged in water-permeable bags for ease of use. The bag can be made of any suitable fibrous or cloth material, including jute, cotton, mesh fabrics, burlap, muslins and combinations thereof. Any suitable packaging can be employed. One example is pillows made of cloth-like materials such as muslin or burlap.

The composites of the invention are highly effective in that they provide a higher level of unimpeded water absorption than any of the components taken alone when used in comparable amounts. The absorption and swelling is extremely rapid as compared to currently available water absorbents and is especially useful for removal of standing water wherein ultra-rapid and efficient water absorption in mandated. As noted previously, the composite can be used as such, but is conveniently supplied packaged in bags of cloth-like material, hereafter Standing Water-Sorb Pillows™, as set forth in the examples below. This permits ease of application where the Pillows™ can simply be dropped into the location of the standing water and efficiently removed. The spent Pillows™ can then be disposed of in various ways, including landfill.

The composite is advantageous because of its stabilized three-dimensional lattice and ability to hydrogen bond to the water to be absorbed and to entrap water as guest molecule as well. Water-absorbing starch resin such as REON™ 200 and Water-Lock™ 400 taken alone are less advantageous because although they are highly absorbent, they tend to swell slowly due to surface swelling and the polymer strands become entangled as a floating mass thus slowing down hydration by forming dry coagulated areas that cannot expand even in the presence of excess water to become hydrated. Water-absorbing PAAs taken alone are less advantageous because they are typically in beaded form and the swollen material does not adhere to form a solidified bondable mass and is also subject to surface swelling. The material floats. While this may be helpful for use in particular applications such as diapers, it is not helpful for removing standing water because handling and transport are difficult. Sufficient mass to effect sinking is required.

The additional components besides the water-absorbing starch resin and the PAA are marginal water absorbers on their own. The self-assembling synthetic scoriaceous material is particularly advantageous in that it not only self-assembles upon hydration but it adheres to all other composite materials enabling co-enclathration, adhesion, hardening, envelopment, engirdlement and stabilization. The present invention provides a composite that is highly absorbent and easy to use which is also self-assembling into a final malleable agglomerated and adhered mass that sinks in standing water. The examples below illustrate the success of this composite.

The following examples are offered to illustrate but not to limit the invention.

Example 1

One gram of each material shown in Table 1 below was placed in a graduated cylinder and water was added. The material was left to statically hydrate for 24 hours after which the total volume of material was measured. Table 1 indicates the total hydrated volume obtained with each sample.

Standing Water-Sorb™ admixture material is composed of 1% zeolite ZK406H®; 1% CBV300; 29% Texas sodium bentonite; 22% Cab-O-Sil™ EH-5; 37% REON™ 200; and 1% PAA partial sodium salt (Sigma); said percentages are by weight. To produce the Pillows™, the Standing Water-Sorb™ material is enclosed in a burlap bag. The bag merely serves to hold the material to point of delivery but a bag structure is not required for performance or functionality. Bags mainly serve as an aid for material delivery and subsequent removal.

TABLE 1

| Material | Hydration Volume (mL/g) |
| --- | --- |
| Zeolite ZK406H ® | 1 |
| CBV300 zeolite | 6 |
| Texas sodium Bentonite | 8 |
| Cab-O-Sil ™ EH-5 | 26 |
| REON ™ 200 | 200 |
| PAA | 300 |
| *All of the Above Combined | 570 |

*Standing Water-Sorb admixture used in Pillow ™ sacs.

The Standing Water-Sorb Pillow™ material absorbed nearly two times as much water as the most commonly used absorbent, polyacrylic acid.

Example 2

Commercially available "sand less sandbags" along with bags made with Standing Water-Sorb material were allowed to soak in 20 gallon tanks of water for 24 hours. After 24 hours the bags were removed and let drain for one hour, then weighed to calculate the amount of water absorbed by each sample. The amount of water was then calculated based on dry weight of the bag prior to submersion in the water. The results are shown in Table 2.

TABLE 2

| Bag | Gallon per Dry Wt. |
| --- | --- |
| Ecosandbag | 3.1 |
| FloodSax ® | 4.4 |
| QuickDam ™ | 4.8 |
| Standing Water-Sorb (material containing) Pillows ™ | 8.2 |

Ecosandbag is composed of sodium polyacrylamide in a jute+woven mesh bag and is available by accessing "ecosandbags.com" on the World Wide Web. Floodsax® comprises a superabsorbent polymer as a pulp and a fiber material in a white woven mesh bag and can be accessed at Floodsax.us.com on the World Wide Web. QuickDam™ comprises a SAP in a black woven mesh bag and can be accessed at "absorb-sp.com" on the World Wide Web. Various other comparable products in bags are available as well, including Aqua-sac™, EZ-bag™, Storm-Bag, Dam-Bag and Absorbeez™. None of the above materials in the aforementioned bags are functional in densification, amassing and sinking in standing water on their own. Materials in the above bag structures merely swell and distribute randomly without sinking in standing water; the materials float without a formed amassed and stable hardened, enveloped and engirdled structure to facilitate handling and disposal.

The invention claimed is:

1. A highly water absorbent composite which comprises at least one reactive fumed silica, at least one absorbent acrylic polymer, at least one fibrous material, and at least first, second and third different scoriaceous materials.

2. The composite of claim 1 which absorbs at least 600 times its weight of water over a period of two hours.

3. The composite of claim 1, wherein
the first scoriaceous material includes natural volcanic zeolite,
the second scoriaceous material includes a self-forming synthetic zeolite Y or natural or synthetic zeolite CBV300 or CBV712, and
the third scoriaceous material includes a synthetic or natural clay.

4. The composite of claim 3 wherein the first scoriaceous material includes zeolite ZK406H.

5. The composite of claim 3 wherein the second scoriaceous material comprises natural or synthetic CBV300 or CBV712.

6. The composite of claim 3 wherein the third scoriaceous material comprises Texas sodium bentonite clay.

7. The composite of claim 1 wherein the fumed silica has a surface area of at least 380 $m^2/g$; and/or
wherein the absorbent acrylic polymer comprises a partially neutralized polyacrylic acid polymer; and/or
wherein the fibrous material comprises starch.

8. The composite of claim 3 wherein the fumed silica has a surface area of at least 380 $m^2/g$; and/or
wherein the absorbent acrylic polymer comprises a partially neutralized polyacrylic acid polymer; and/or
wherein the fibrous material comprises starch.

9. The composite of claim 7 wherein the starch is coupled to an acrylic polymer.

10. The composite of claim 8 wherein the starch is coupled to an acrylic polymer.

11. The composite of claim 1 which comprises 10-30% of reactive fumed silica, 1-15% of absorbent acrylic polymer, 30-40% of fibrous component, and 1-35% of said first, second and third scoriaceous material by weight.

12. The composite of claim 11 which comprises 10-30% of reactive fumed silica, 1-15% of absorbent acrylic polymer, 30-40% of fibrous component, 1-15% of a clinoptilolite zeolite, 1-5% of zeolite Y, and 25-35% clay by weight.

13. The composite of claim 12 wherein the reactive fumed silica has a surface area of at least 380 $m^2/g$, the absorbent acrylic polymer is partially neutralized polyacrylic acid and the fibrous component is a starch copolymer with a polyacrylonitrile.

14. The composite of claim 13 which comprises Cab-O-Sil™ EH5, polyacrylic acid partially neutralized, REON™ 200, zeolite ZK406H®; synthetic zeolite CBV300 and Texas sodium bentonite clay.

15. The composite of claim 1 which is packaged in a bag form.

16. The composite of claim 3 which is packaged in a bag form.

* * * * *